Feb. 7, 1928.

K. STAMM

ELECTRIC DRY BATTERY

Filed Feb. 9, 1925

1,658,142

Inventor
Karl Stamm
By Marks & Clerk

Patented Feb. 7, 1928.

1,658,142

UNITED STATES PATENT OFFICE.

KARL STAMM, OF BERLIN-DAHLEM, GERMANY, ASSIGNOR TO MANNESMANN-LICHT-A.-G., OF BERLIN, GERMANY.

ELECTRIC DRY BATTERY.

Application filed February 9, 1925, Serial No. 8,040, and in Germany March 24, 1924.

This invention relates to a dry battery or cell, in which the electrolyte is stored in a separate closed vessel of breakable material, such as glass, within the cell, which vessel is broken by a shock or blow, when the cell is to be made ready for use. The electrolyte is then distributed throughout the cell by shaking the latter.

According to the present invention a hole is bored into the electrode or absorbent material, which is fixed in the container so as to be immovable, and the separate vessel for the electrolyte is destroyed by a member which is preferably insulated or consists of non-conducting material and is driven into the hole. This member may for instance be an enamelled and consequently insulated iron wire, which provides the further advantage that it is practically impossible for a short circuit to take place and the member to be broken, when the battery is put into use.

Various proposals have been made for destroying the separate vessel within the battery, for instance it has been suggested to move the carbon electrode from the outside or a blow or pressure has to be given at a predetermined point of the container also from the outside. In each case a member or a part of the container, (which is easily accessible from the outside, has to be subjected directly to a mechanical action. It is however obvious that the projecting carbon electrode, the part of the container or the like may be forced in during transport or through clumsy or inexperienced treatment and the separate vessel thereby destroyed, even when the battery is not intended to be taken into use. The various suggestions, which for instance include the provision of a screw or the like in the bottom of the container, have the further disadvantage that, when the vessel is driven in and broken, it has been found impossible, as a result of many experiments, to prevent the electrolyte escaping at the place where the screw enters and the electrolyte is found to crystallize at this point in a great many of the cases referred to.

According to one constructional form of the invention the striking or pressure exerting member is inserted in the battery in such a position that it will at first, that is as long as the battery is not taken into use, lie within the battery in a position, in which it cannot be directly reached from outside, while, on the battery being taken into use, it must be driven in by means of a separate auxiliary member, until it destroys the separate vessel. This has the advantage, that the breaking member which is located in the container may be so placed and in some cases guided that there will be no leakage or outflow of the electrolyte in any of its positions. This member is therefore a braking member and a sealing member.

Various constructional examples are shown in the accompanying drawing, in which

Figure 1:
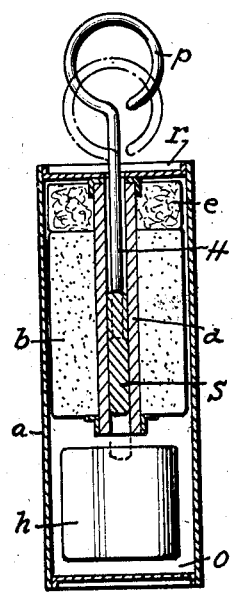
Fig. 1 is a vertical section through one preferred form of the invention.

In Fig. 1, $a$ is a container of a dry battery, made for instance of an active material, such as zinc. In it is firmly fixed the absorbent member $b$, consisting of an absorbent substance, for instance cotton wool, and a depolarizing layer.

The lower space $o$ serves for the reception of a separate vessel $h$ of glass or some other breakable material for the electrolyte. The separate vessel may be spherical or may be adapted more or less to the shape of the space $o$. This vessel may either be made uniformly of breakable, insulating material or may have one particularly readily broken spot, which is opposite the member serving for the opening or destruction of the vessel. Such a sensitive spot may be formed by the provision of a paraffin stopper or the like. In this case the remainder of the separate vessel may consist of non-breakable material, in which case it will suffice if its internal surface is made resistant to the chemical action of the electrolyte.

For the introduction of the striking member a bore $x$ is provided in the carbon electrode $d$, through which a pin $p$ can be plunged.

In the bore $x$ of the electrode $d$ is provided a striking member $s$, preferably of non-conducting material. It is for instance mounted in the bore $x$ by means of a pitch or ozokerite mixture or the like, which has a high melting point, so that it does not project beyond the cover $r$ of the container, but preferably lies at a suitable depth within the bore $x$, so that it cannot be displaced by any accidental external mechanical influences. The object of the pitch or ozokerite surrounding of the striking member is to provide a fluid seal for the member, without interfering with its mobility.

At the cover end the container is closed in any suitable manner, for instance by means of a seal $e$ made of an electrical non-conducting compound. A cover $r$, for instance of cardboard, is preferably placed above the cell.

Figure 3:
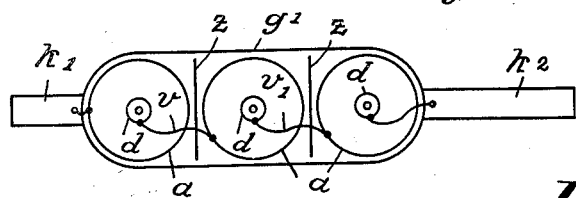
Fig. 3 is a plan view of a composite battery.

Usually three such separate cells are combined to form a battery of suitable voltage, the arrangement being such that the carbon electrode of the first cell is connected to the zinc electrode of the next cell, so that between the zinc electrode of the first cell and the carbon electrode of the third cell there will be the total voltage of the three cells connected in series. The three zinc containers, which are open at the top, are then together inserted in a cardboard casing $g$, as shown in plan in Fig. 3, the separate containers being electrically separated by a packing $z$ of fibrous material, for instance cardboard, and held firmly in position in the casing by sawdust or the like. The electric connections $v$, $v_2$ are thereupon established and finally the spring contacts $k_1$, $k_2$ are electrically connected to the container of the first cell and the carbon electrode of the last cell. Sealing material is thereupon applied at the top in a layer of suitable thickness so that all three cells are completely insulated from the outside. Over this sealing material a cardboard cover may finally be placed, which may be connected to the casing $g_1$ or simply stuck on to the sealing material.

Figure 2:
Fig. 2 is a striking member for the same.

The cover may be made any suitable shape, but is provided in any case with inward bulges, through which the separate striking member $p$, which is supplied with each battery and may for instance have the form of a pin as shown in Fig. 2, is pierced, when the battery has to be put in use. The pin will then penetrate in the bore $x$ and will strike the member $s$ which, when further pressure is exerted on the pin, is forced down and finally breaks the vessel $h$. A cracking sound indicates clearly that the vessel has been broken. The bore $x$ is not open, but is still closed by the striking member $s$, which was sealed in with pitch. The pin is then withdrawn and the two other cells pierced with it, after which the battery may be shaken and will be found immediately to have the required voltage.

The member for driving in the striking member $s$ should not be loose, but may, if desired, be fixed to a cell holder. This member, which penetrates from the outside, does not effect the destruction of the separate vessel directly, but indirectly, and that the intermediate member at the same time forms a fluid seal.

What I claim is:

1. In a dry cell, a fixed electrode having a bore, a separate vessel having a part of its wall of easily breakable material positioned underneath said electrode and containing the electrolyte, a member capable of being driven in said bore of said electrode to break said separate vessel, and sealing means for said bore of said electrode.

2. In a dry cell, a fixed electrode having a bore, a separate vessel of easily breakable material positioned underneath the electrode and containing the electrolyte, a member capable of being driven in said bore of said electrode to break said separate vessel, and said member after being driven in acting to seal said bore.

3. In a dry cell, a fixed electrode having a bore, a separate vessel of easily breakable material positioned underneath the said electrode and containing the electrolyte, an insulating member capable of being driven in said bore of said electrode to break said separate vessel, and sealing means for the bore of said electrode.

4. In a dry cell, a hollow electrode, a member within said electrode, a chamber underneath said electrode within the cell containing the electrolyte and having a breakable wall, separate means for driving in said member and destroying said chamber, and sealing means for said hole of said electrode.

5. In a dry cell, a hollow electrode, a member within said electrode, a chamber underneath said electrode within the cell containing the electrolyte and having a breakable wall, separate means for driving in said member and destroying said chamber, and sealing means for said member in said hollow electrode.

KARL STAMM.